(12) United States Patent  
Davis et al.

(10) Patent No.: US 7,300,035 B2
(45) Date of Patent: Nov. 27, 2007

(54) VALVE, ACTUATOR AND CONTROL SYSTEM THEREFOR

(75) Inventors: Albert S. Davis, Richmond, TX (US); John M. Saldivar, Richmond, TX (US); David R. Mefford, The Woodlands, TX (US); Frank J. Arriens, Houston, TX (US); Daryl L Ard, Kemah, TX (US); Anthony Laitkep, Wharton, TX (US); Leonard Martinak, Friendswood, TX (US); Larry Vyvial, Rosenberg, TX (US); Jim Mohrfield, Houston, TX (US)

(73) Assignee: Cameron International Corporation, Houston, TX (US)

( * ) Notice: Subject to any disclaimer, the term of this patent is extended or adjusted under 35 U.S.C. 154(b) by 49 days.

(21) Appl. No.: 11/210,583

(22) Filed: Aug. 24, 2005

(65) Prior Publication Data

US 2006/0022159 A1   Feb. 2, 2006

Related U.S. Application Data

(63) Continuation-in-part of application No. 10/814,461, filed on Mar. 31, 2004, now Pat. No. 6,986,499.

(51) Int. Cl.
    *F16K 31/44* (2006.01)
(52) U.S. Cl. .................. 251/285; 251/58; 251/63.5; 74/25; 74/57; 92/32
(58) Field of Classification Search .......... 92/31, 92/32, 33, 13.5, 13.6; 251/285, 58, 62, 63.5, 251/265; 74/55, 25, 57
    See application file for complete search history.

(56) References Cited

U.S. PATENT DOCUMENTS

| 2,447,094 | A | * | 8/1948 | Schlote | ................ | 81/165 |
| 2,896,582 | A |   | 7/1959 | Justice |  |  |
| 3,391,722 | A | * | 7/1968 | Ligh | ................ | 160/188 |
| 3,438,451 | A | * | 4/1969 | Hayes, Jr. | .............. | 173/213 |
| 3,648,458 | A |   | 3/1972 | McAlister |  |  |

(Continued)

FOREIGN PATENT DOCUMENTS

WO     WO 02/37008     5/2002

(Continued)

*Primary Examiner*—John Rivell
*Assistant Examiner*—John K. Fristoe, Jr.
(74) *Attorney, Agent, or Firm*—Conley Rose, P C

(57) ABSTRACT

A valve actuator comprising a lower housing comprising a mounting spool that is operable to couple to a valve body. A rotating sleeve is disposed within the lower housing and coupled to a stem connector. A fixed sleeve in disposed within the lower housing and includes a first slot disposed therethrough. A second slot is disposed in the rotating sleeve, wherein at least one of the slots is a helical slot. An axle engages both the first slot and the second slot. A shaft is coupled to the axle and extends through a connector flange that is coupled to an upper end of the lower housing. A piston is coupled to the shaft and movably disposed within an upper housing that is coupled to the connector flange. Axial movement of the piston within the upper housing will result in rotational movement of the rotating sleeve.

24 Claims, 11 Drawing Sheets

U.S. PATENT DOCUMENTS

| | | | |
|---|---|---|---|
| 4,436,280 A | * | 3/1984 | Geisow ...................... 251/229 |
| 4,460,152 A | | 7/1984 | DiPasquale et al. |
| 4,651,969 A | * | 3/1987 | Dowdall ...................... 251/14 |
| 5,134,923 A | * | 8/1992 | Wexler .......................... 92/31 |
| 5,419,237 A | * | 5/1995 | Jeppsson ....................... 92/31 |
| 6,196,523 B1 | * | 3/2001 | Miyata et al. ............... 251/276 |
| 6,231,027 B1 | | 5/2001 | Baker et al. |
| 6,494,434 B1 | | 12/2002 | Geiser |

FOREIGN PATENT DOCUMENTS

| WO | WO 03/025428 | 3/2003 |
|---|---|---|

\* cited by examiner

VALVE, ACTUATOR AND CONTROL SYSTEM THEREFOR

CROSS-REFERENCE TO RELATED APPLICATIONS

This application is a continuation-in-part of U.S. application Ser. No. 10/814,461, filed Mar. 31, 2004, now U.S. Pat. No. 6,986,499 which is incorporated herein by reference in its entirety.

STATEMENT REGARDING FEDERALLY SPONSORED RESEARCH OR DEVELOPMENT

Not applicable

BACKGROUND OF THE INVENTION

This invention relates to a system of a hydraulic actuator for operating a valve between open and closed positions and the control system used to regulate the operation of the actuator. This system is particularly suited for operation of ball valves used in the oil and gas industry. These ball valves are typically used in gas pipelines to control the flow of gas through the pipeline. The actuator of the present invention uses gas pressure from the pipeline to power the actuator. In the event gas pressure from the pipeline is unavailable or inaccessible, a pair of manual hand pumps are incorporated to allow operation of the actuator and valve.

Prior actuators utilizing the gas pressure of the pipeline as a power source typically have a double acting piston upon which the gas acts to drive the actuator and hence the valve to be opened or closed. These actuators have vented the gas pressure from one side of the double acting piston as gas pressure is applied to the other side of the piston. This venting is necessary to ensure that equal pressure is not acting on both sides of the piston simultaneously. In this event, the force acting on both sides of the piston would balance and the actuator would fail to operate or be "pressure locked" as commonly referred to in the industry.

As a result of the need to vent each side of the actuator piston to ensure proper operation, the gas pressure is usually vented to atmosphere. This gas is not a pure gas but in fact has hydrocarbon liquids entrained in the gas, known as condensate in the industry. When this venting to atmosphere occurs, the hydrocarbon liquid condensate condenses and becomes a sticky, unsightly oily residue on the ground adjacent the valve and actuator. In recent years this venting to the atmosphere of the gas has raised environmental concerns due to possible contamination of the ground and groundwater by this oily residue.

Another concern with prior valve, actuator and control system assemblies has been the interface and operation of the manual hand pumps that are required to operate the actuator and valve when gas pressure from the pipeline is not available. This may occur during new installations when the pipeline has not been filled with gas yet and opening or closing of the valve is needed. Other times when maintenance is to be performed on the valve or actuator, the pipeline must be bled of gas pressure as a safety precaution. When it is desired to operate the valve prior to subsequent pressurization of the pipeline, the ability to operate the valve and actuator manually is required. Prior valve, actuator and control system assemblies have had problems in their design and operation that allowed possible scenarios in which pressurization of the pipeline and thus the actuator, could result in inadvertent operation of the actuator while manual operation of the actuator was occurring and possible injury to an operator. It is therefore desirable to have a valve, actuator and control system assembly that allows minimizing the size of the actuator and operation of the control system in a manual mode that automatically prevents accidental operation by pipeline pressure. The valve, actuator and control system of the present invention offers such novel features.

SUMMARY OF THE INVENTION

The present invention relates to a system of a hydraulic actuator for operating a valve between open and closed positions, the valve itself and the control system used to regulate the operation of the actuator. The valve is installed in a gas pipeline, typically used in the oil and gas industry, to control flow through the pipeline. The actuator of the present invention uses gas pressure from the pipeline to power the actuator.

The valve is a ball valve that uses a spherically shaped ball to control fluid flow through the valve. End flanges are welded to the outer body shell for connection to mating pipeline connections. A quarter turn of the ball moves the valve from open to closed positions. The valve actuator is mounted on top of the valve and rotates the ball between open and closed positions when operated.

A valve actuator comprising a lower housing comprising a mounting spool that is operable to couple to a valve body. A rotating sleeve is disposed within the lower housing and coupled to a stem connector. A fixed sleeve in disposed within the lower housing and includes a first slot disposed therethrough. A second slot is disposed in the rotating sleeve, wherein at least one of the slots is a helical slot. An axle engages both the first slot and the second slot. A shaft is coupled to the axle and extends through a connector flange that is coupled to an upper end of the lower housing. A piston is coupled to the shaft and movably disposed within an upper housing that is coupled to the connector flange. Axial movement of the piston within the upper housing will result in rotational movement of the rotating sleeve.

The hydraulic control system for the valve actuator is comprised of open and close circuits with each circuit including a control valve, a pair of pilot operated valves and a fluid supply tank for supplying control fluid under pressure to the appropriate actuator function. The outlet port of the second pilot operated valve in each circuit is connected to an exhaust orifice valve. The control valve in each circuit receives pressurized gas from an outlet on the pipeline and directs this pressurized gas to the appropriate tank when the control valve is operated. This pressurized gas is also used to operate the pilot operated valves to control venting of pressure from one tank while the other is being pressurized to prevent pressure lock and allow equalization of pressure between the tanks after the valve is moved to its fully open or closed position.

A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

Figure 2:
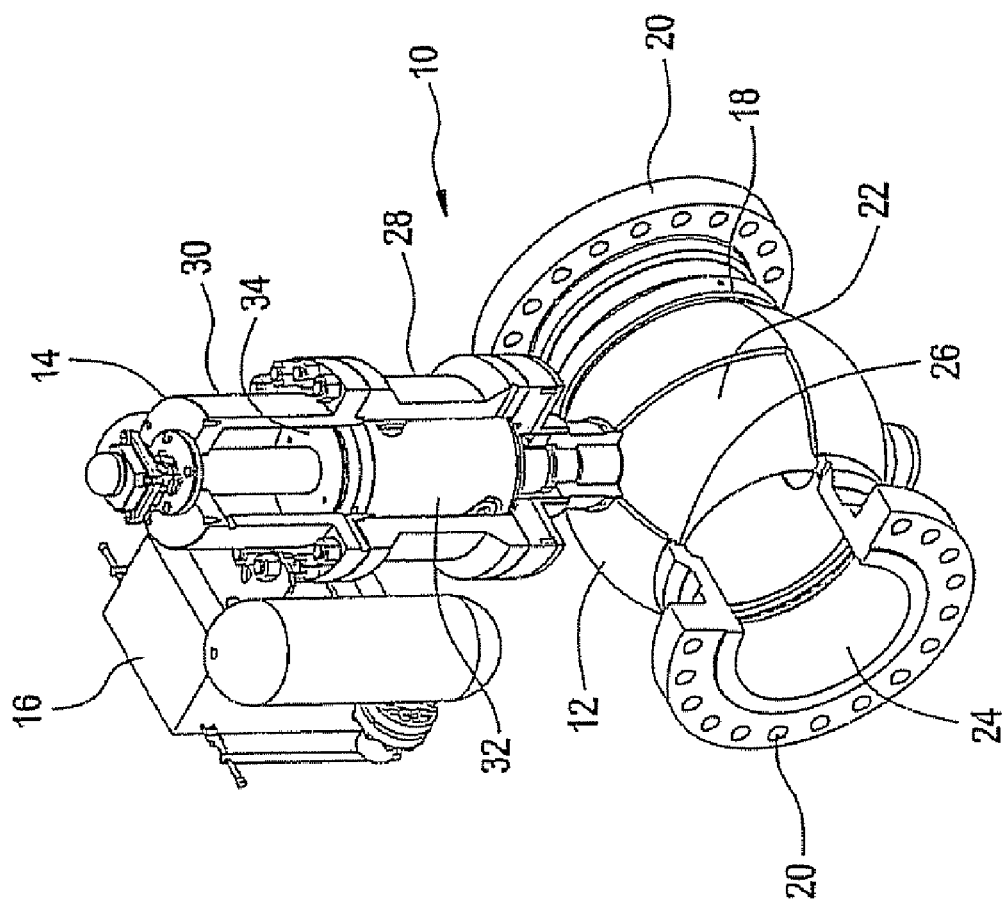
FIG. 2 comprises a perspective view from the opposite side with partial sectional views of the valve and actuator to show the main components.
Figure 1:
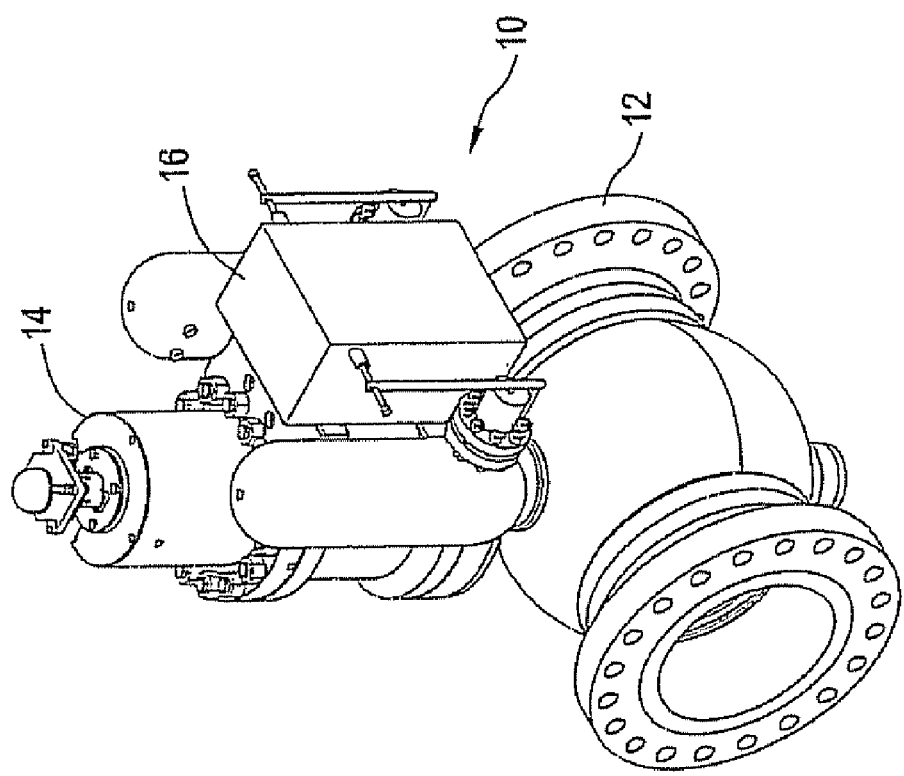
FIG. 1 comprises a perspective view of a system for controlling fluid flow through a pipeline including valve, actuator and control system assembled together.

With reference to the drawings, and particularly to FIG. 1 a perspective view of a system 10 for controlling fluid flow through a pipeline including valve 12, actuator 14 and control system 16 assembled together is shown. FIG. 2 is a perspective view from the opposite side with partial sectional views of valve 12 and actuator 14 to show the main components. Valve 12 is a ball valve of the type commonly used in the oil and gas industry, with a welded body 18 and end flanges 20 for installing valve 12 into a pipeline (not shown) through which valve 12 will control the flow of oil and gas. Valve 12 includes a flow controlling member or ball 22, disposed in welded body 18, with a bore 24 therethrough. Seal elements 26 in welded body 18 seal against ball 22. Rotation of ball 22 a quarter turn by actuator 14 closes valve 12.

Figure 3:
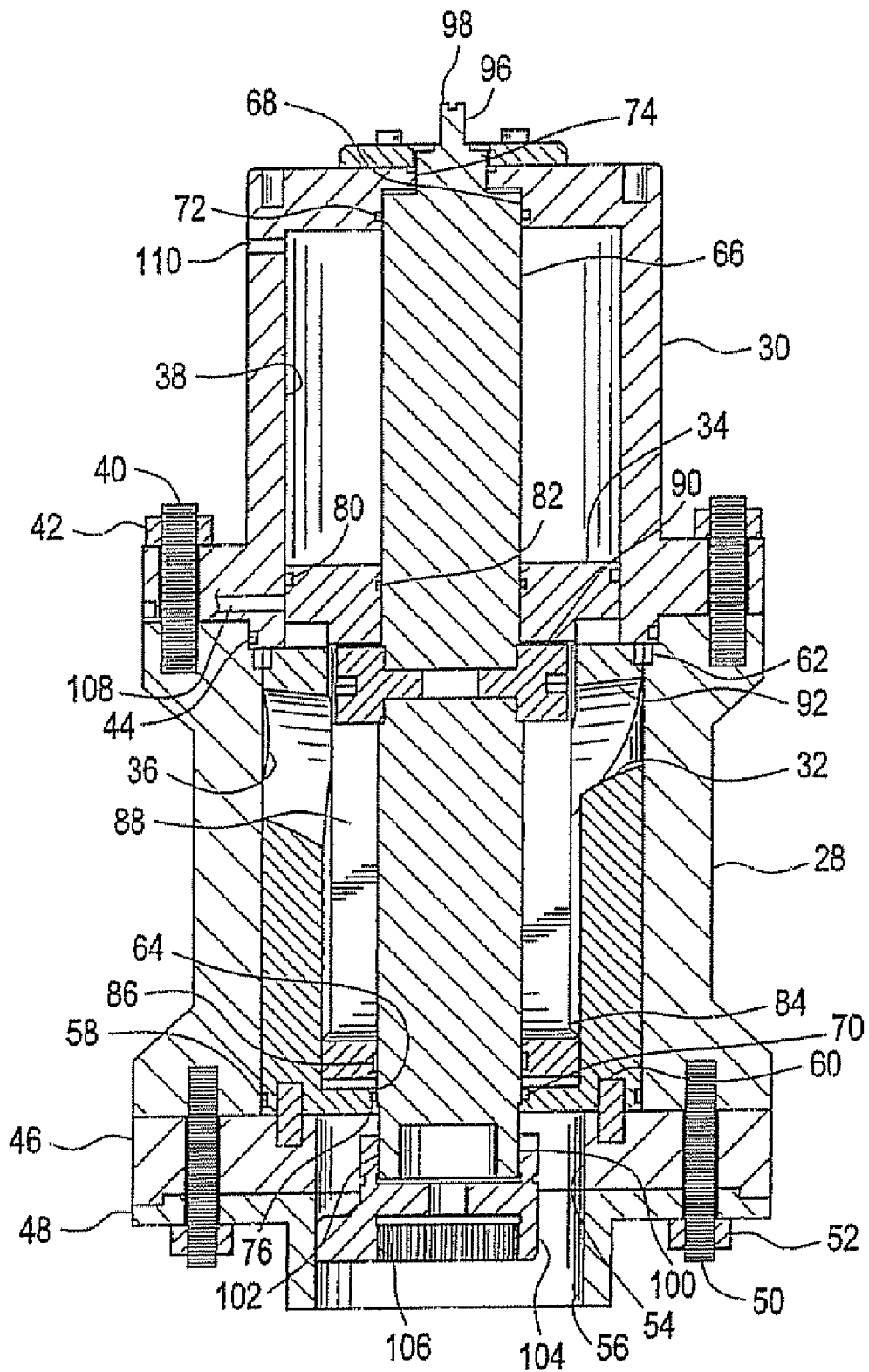
FIG. 3 comprises a sectional view of the valve actuator in the valve closed position.
Figure 4:
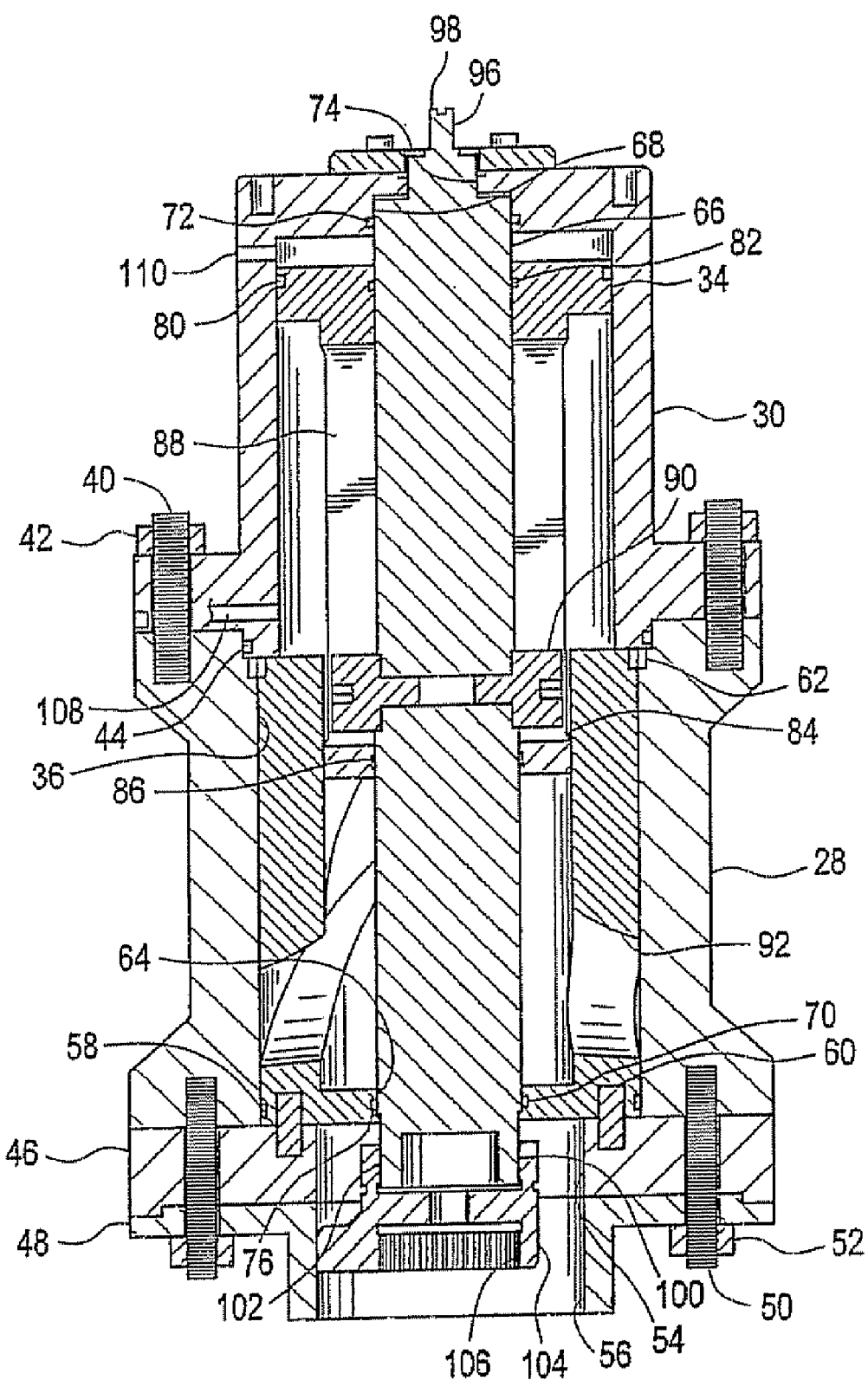
FIG. 4 comprises a sectional view of the valve actuator in the valve open position.

Actuator 14 includes lower actuator housing 28 to which actuator cylinder housing 30 is secured. Helix sleeve 32 is disposed within lower actuator housing 28 and actuator piston sleeve 34 is positioned within helix sleeve 32. Details of construction of actuator 14 and actuation of helix sleeve 32 are shown in sectional views FIGS. 3 and 4 and perspective view FIG. 5. FIG. 3 shows actuator 14 in the position of valve 12 being closed and FIG. 4 shows actuator 14 in the position of valve 12 being open. Lower actuator housing 28 has bore 36 extending therethrough. Actuator cylinder housing 30 has counter bore 38 extending therein and is secured to lower actuator housing 28 by suitable securing means as studs 40 and nuts 42. Bore 36 and counterbore 38 are axially coincident. Lower actuator housing 28 is sealed against actuator cylinder housing 30 by sealing means in the form of seal ring 44.

Lower actuator plate 46 and guide sleeve 48 are secured to the opposite end of lower actuator housing 28 by suitable securing means as studs 50 and nuts 52. Lower actuator plate 46 and guide sleeve 48 have bores 54 and 56 therethrough. Helix sleeve 32 is secured within lower actuator housing 28 by lower actuator plate 46 and actuator cylinder housing 30. Seal ring 58 seals helix sleeve 32 to lower actuator housing 28 while first and second securing means in the form of anti-rotation or dowel pins 60 and 62 between helix sleeve 32 and lower actuator housing 28 prevent helix sleeve 32 from rotational movement with respect to lower actuator housing 28 and actuator cylinder housing 30.

Helix sleeve 32 includes reduced diameter bore 64 on the end adjacent lower actuator plate 46. Actuator drive shaft 66 is a cylindrical member that extends between bore 68 in actuator cylinder housing 30 and reduced diameter bore 64 of helix sleeve 32. Actuator drive shaft 66 is sealed in bores 64 and 68 by seal rings 70 and 72, respectively. Bore 68 is axially coincident with counter bore 38 as is stepped bore 74 in actuator cylinder housing 30. Adjacent reduced diameter bore 64 is stepped bore 76 in helix sleeve 32. Stepped bores 74 and 76 act to axially restrain actuator drive shaft 66 when actuator 12 is assembled.

Figure 5:
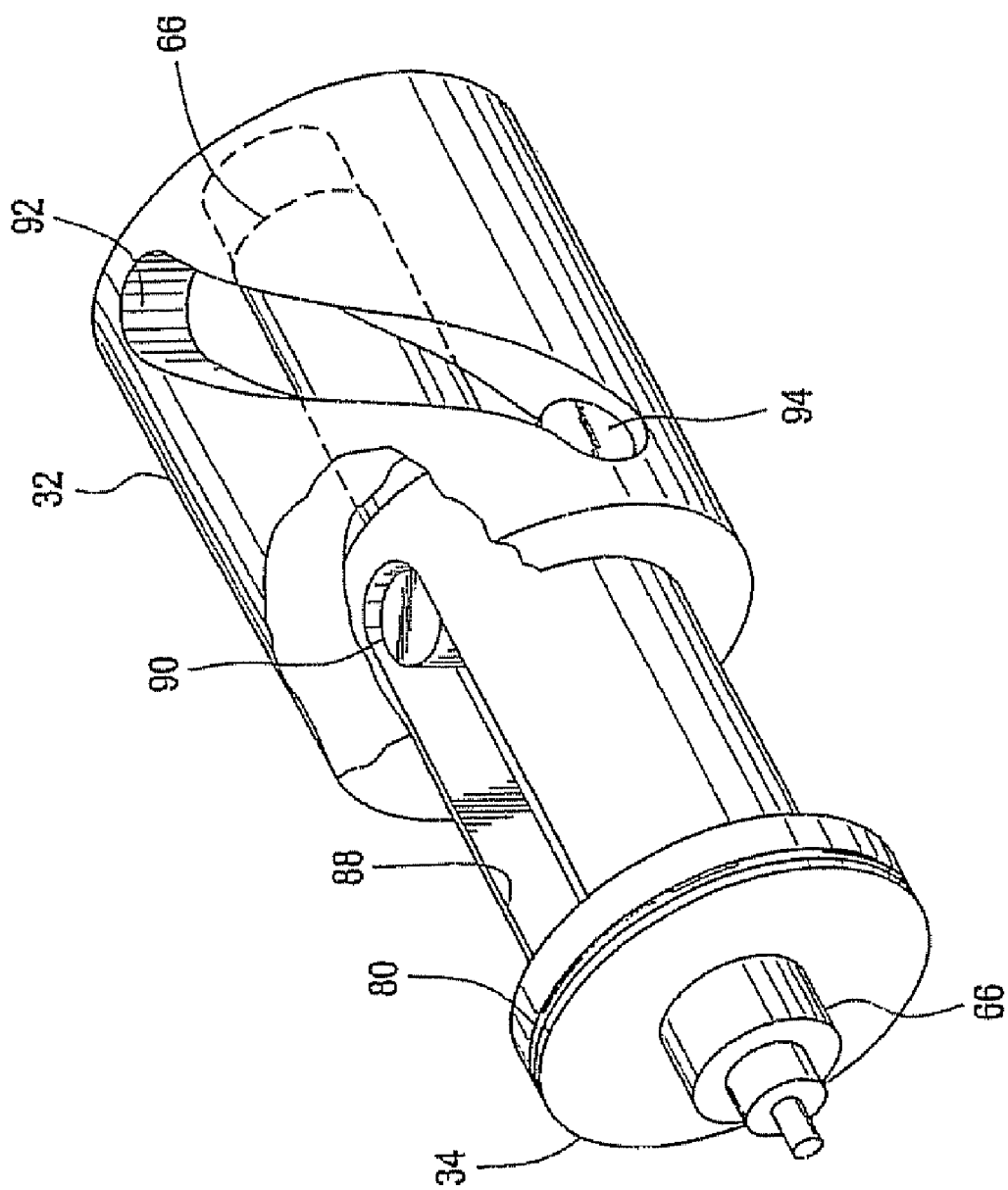
FIG. 5 comprises a perspective view of the actuator and actuation of the helix sleeve therein.

Actuator piston sleeve 34 is sealingly disposed in the annulus between actuator drive shaft 66 and counter bore 38 of actuator cylinder housing 30. Seal rings 80 and 82 seal actuator piston sleeve 34 to actuator drive shaft 66 and counter bore 38 of actuator cylinder housing 30. Actuator piston sleeve 34 has a reduced diameter portion 84 that extends into the annulus between actuator drive shaft 66 and helix sleeve 32 and seals on actuator drive shaft 66 with seal ring 86. Reduced diameter portion 84 of actuator piston sleeve 34 has a pair of axially disposed slots 88 formed therein. An actuation means in the form of a pair of rollers 90 are secured to actuator drive shaft 66 at approximately its middle and rollers 90 engage axially disposed slots 88 for purposes to be described hereinafter. Helix sleeve 32 includes a pair of helical slots 92 formed in its wall. As best seen in FIG. 5, a second actuation means in the form of a pair of rollers 94 are secured to the lower end of reduced diameter portion 84 of actuator piston sleeve 34 at right angle to axially disposed slots 88 and engage helical slots 92 in helix sleeve 32.

First end 96 of actuator drive shaft 66 extends beyond stepped bore 74 and includes indicator means or slot 98 formed thereon to indicate the rotational position of actuator drive shaft 66. Opposite or second end 100 of actuator drive shaft 66 extends beyond stepped bore 76 and includes engaging means in the form of male spline 102 formed thereon. Valve closure adapter 104 engages spline 102 and connects to valve 12 with spline 106 to transmit the torque generated by actuator 14. Ports 108 and 110 in actuator cylinder housing 30 allow pressurized hydraulic fluid, supplied by control system 16 in a manner to be described hereinafter, to operate actuator 12 in the following manner.

As noted above, FIG. 3 shows actuator 14 in the position with valve 12 closed. Actuator piston sleeve 34 is at the bottom of its stroke. When it is desired to open valve 12, pressurized hydraulic fluid to supplied to port 108 while port 110 is vented. The pressurized hydraulic fluid acts on the underside of actuator piston sleeve 34 against the annular piston area defined by seals 80 and 82 while seals 44, 58 and 70 maintain pressure in lower actuator housing 28. As actuator piston sleeve 34 is urged upwardly, slots 88 move axially over rollers 90 on actuator drive shaft 66. Simultaneously, rollers 94 on reduced diameter portion 84 of actuator piston sleeve 34 are engaging helical slots 92 of helix sleeve 32. As helix sleeve 32 is anti-rotated with respect to lower actuator housing 28 by pins 60 and 62, rollers 94 are forced to move along helical slots 92 of helix sleeve 32 which causes actuator piston sleeve 34 to rotate with respect lower actuator housing 28. This rotation of lower actuator housing 28 is transmitted through axial slots 88 and rollers 90 to actuator drive shaft 66, thus rotating valve closure adapter 104 and valve 12 through splines 106 to move valve 12 to its open position shown in FIG. 4. When it is desired to close valve 12, pressurized hydraulic fluid is supplied to port 110 while port 108 is vented to reverse the direction of rotation.

Figure 6:
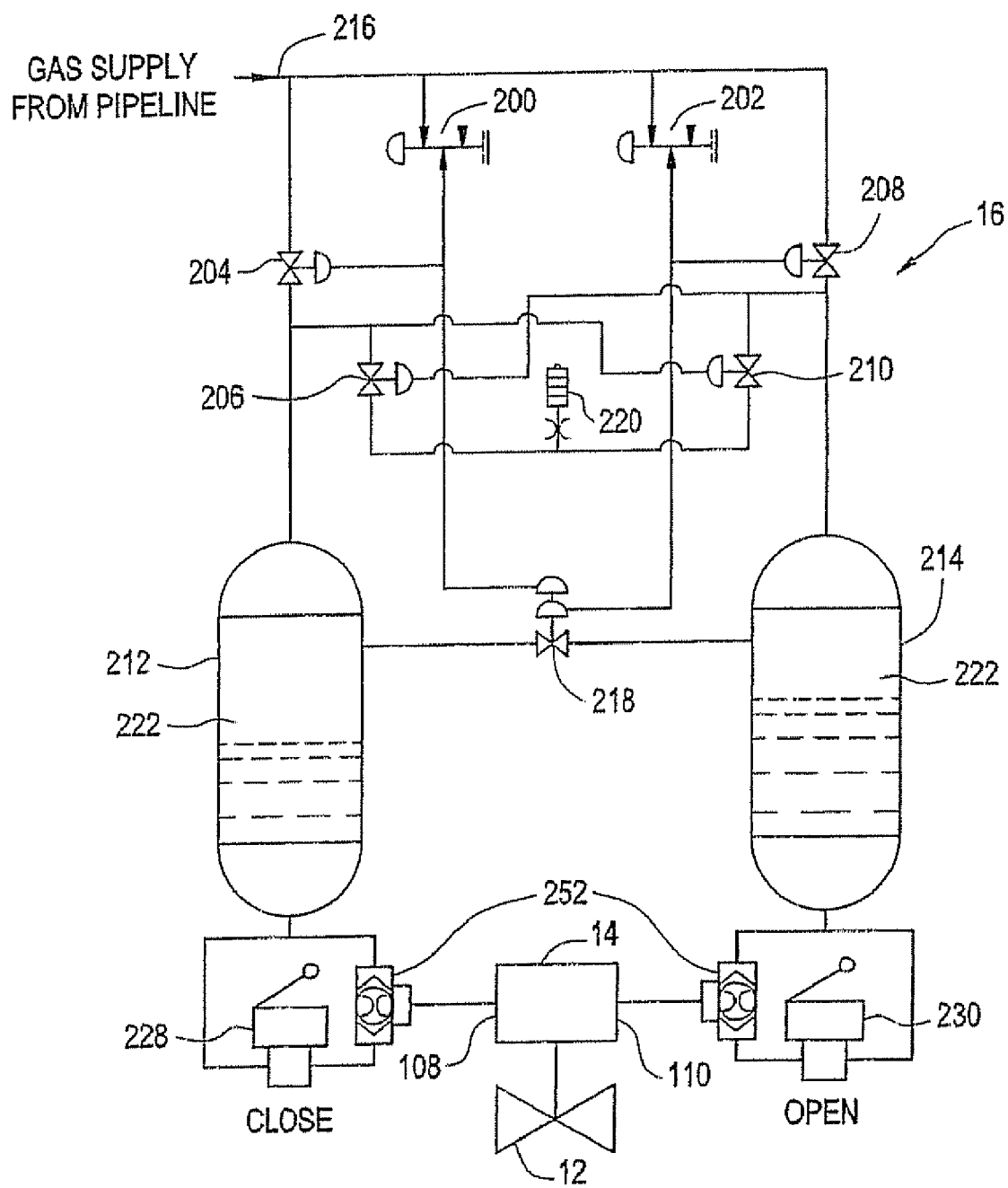
FIG. 6 comprises a schematic view of the control system.
Figure 7:
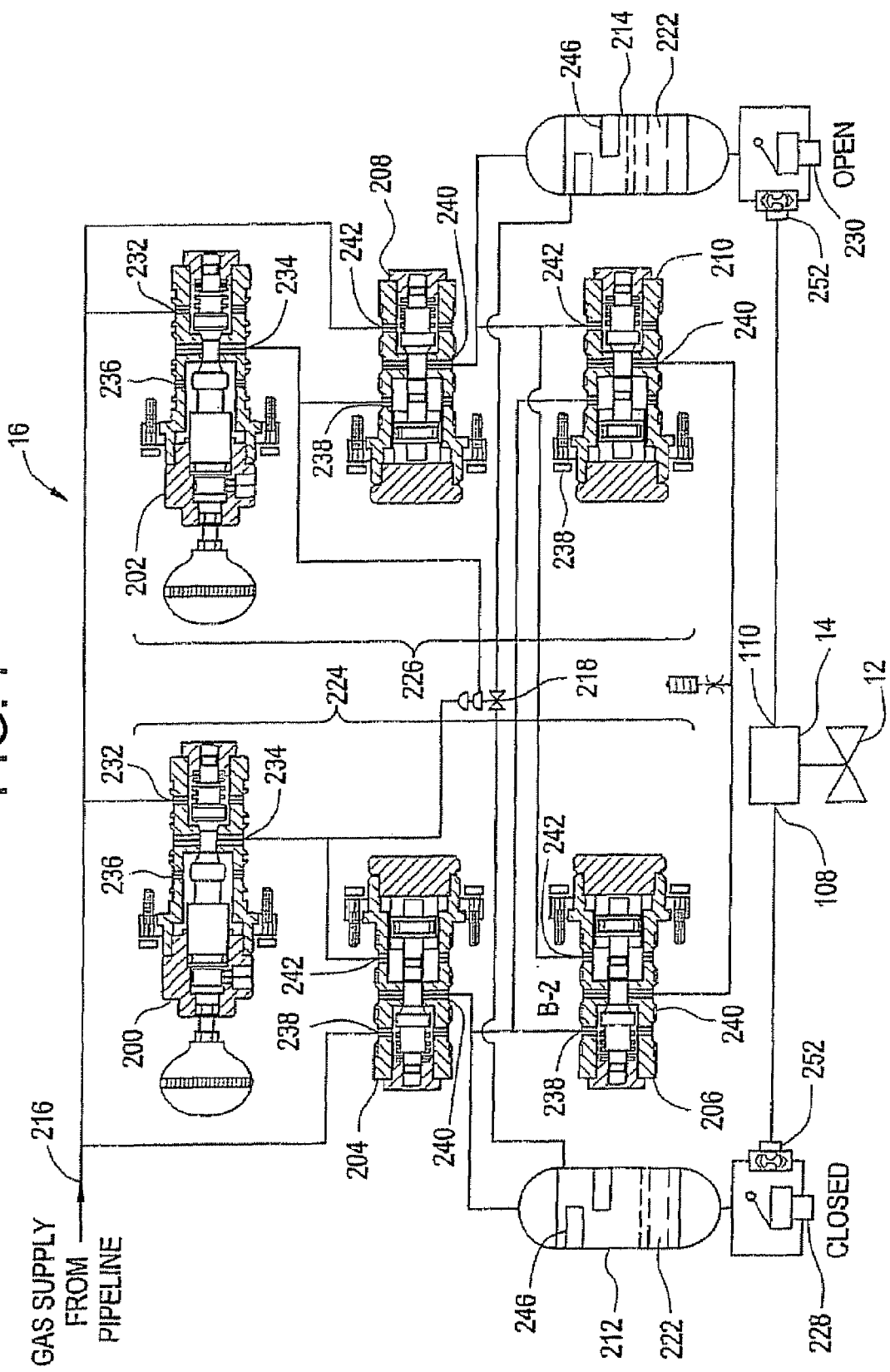
FIG. 7 comprises a view of the flow diagram of the control system.

Operation of valve 12 and actuator 14 is regulated by control system 16 which is shown in schematic form in FIG. 6 and in flow diagram form in FIG. 7. FIG. 6 shows control system 16 includes first and second control valves 200 and 202 controlling operation of actuator 14 through first through fourth pilot operated valves 204, 206, 208 and 210. Valves 200-210 control hydraulic fluid flow from first and second actuator fluid supply tanks 212 and 214 to the open and close ports 108 and 110 of actuator 14. Control system 16 includes a fluid pressure source 216 which is gas pressure supplied from the pipeline (not shown) through which valve 12 and actuator 14 control gas flow. Control system 16 further includes a normally open double pilot operated two way valve 218 to equalize gas pressure between tanks 212 and 214 which is bled to atmosphere through exhaust orifice valve 220. First and second actuator fluid supply tanks 212 and 214 have hydraulic fluid 222 in their lower portion which is the pressurized fluid supplied to actuator 14. Hydraulic fluid 222 is pressurized by the action of pipeline gas pressure acting thereon.

The flow diagram of FIG. 7 shows details of the construction of the components of control system 16 and the gas and hydraulic fluid flow therebetween. Control system 16 is divided into first and second control circuits 224 and 226. First control circuit 224 acts to supply hydraulic fluid 222 to port 108 and operate actuator 14 to close valve 12, while second control circuit 226 acts in reverse to supply hydraulic fluid 222 to port 110 and operate actuator 14 to open valve 12. Additionally, control system 16 includes manually operated hand pumps 228 and 230 mounted on first and second actuator fluid supply tanks 212 and 214, respectively, for purposes to be described hereinafter.

First and second control valves 200 and 202 are manually operated valves including inlet port 232, outlet port 234 and vent port 236. In the closed position, fluid flow between inlet port 232 and outlet port 234 is blocked while outlet port 234 is connected to vent port 236. In the open or operating position, fluid flows between inlet port 232 and outlet port 234 while vent port 236 is blocked. First through fourth pilot operated valves 204, 206, 208 and 210 are two way normally closed pilot operated valves including inlet port 238, outlet port 240 and pilot port 242. In the closed position, i.e., no pressure supplied to pilot port 242, fluid flow between inlet port 238 and outlet port 240 is blocked. In the open, i.e., pilot operated position, pilot pressure supplied to pilot port 242 allows fluid flow between inlet port 238 and outlet port 240. First and second control valves 200 and 202 and first through fourth pilot operated valves 204, 206, 208 and 210 are mounted in a manifold block (not shown) in a manner well known to those of ordinary skill in the art control system 16 also includes double pilot operated two way valve 218 with pilot pressures supplied from first and second control circuits 224 and 226.

First and second actuator fluid supply tanks 212 and 214 are identical in construction. Tanks 212 and 214 are supplied with hydraulic fluid 222 partially filling the tanks. Baffles 246 are positioned in tanks 212 and 214 to aid in maintaining separation between the pressurized gas supplied by the pipeline and hydraulic fluid 222. Manually operated hand pumps 228 and 230 and mounted on tanks 212 and 214, respectively, and each pump 228 and 230 includes shuttle valve 252 mounted thereon.

Figure 8:
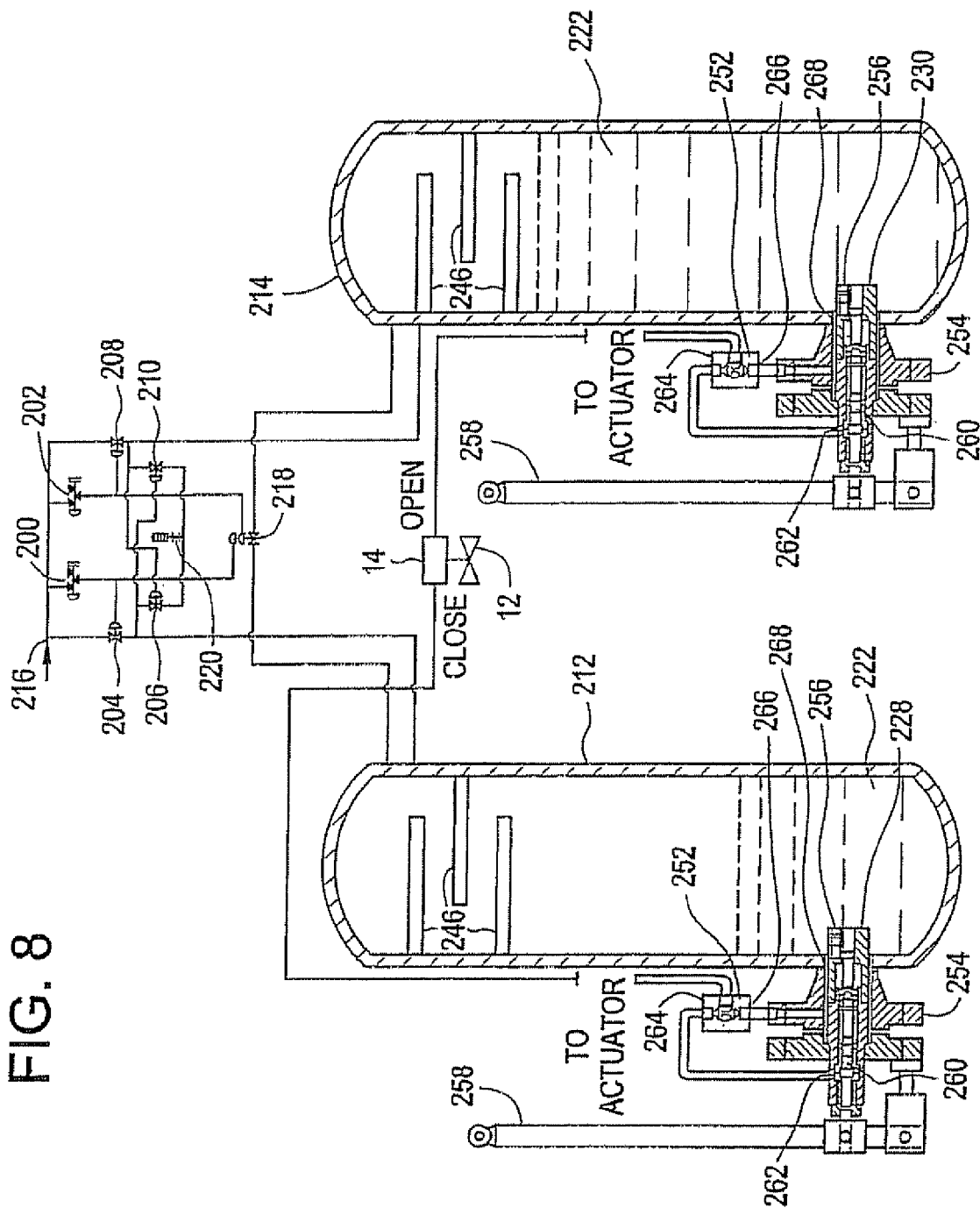
FIG. 8 comprises a sectional view of the fluid supply tanks and manually operated valves mounted thereon of the control system.

Details of construction and operation of tanks 212 and 214, pumps 228 and 230 and shuttle valves 252 are shown in FIG. 8. Only the description of tank 212, pump 228 and shuttle valve 252 are given as tank 214 and pump 230 are identical thereto. Pump 228 is mounted to tank 212 by double flange 254 with pump 248 extending into tank 212 and immersed in hydraulic fluid 222. Pump 228 is of the "sucker rod" type well known to those of ordinary skill in the art with hydraulic fluid 222 being drawn into pump 228 through spring loaded ball 256 when handle 258 is stroked away from tank 212. Hydraulic fluid 222 is pressurized in pump 228 as handle 258 is stroked toward tank 212 and unseats spring loaded ball 260 and is directed out port 262 to shuttle valve 252. Shuttle valve 252 shuttles between a position in which fluid from port 262 flows through shuttle valve 252 to outlet port 264 and to either port 108 or 110, depending on which tank is being used, and a second position in which pressurized hydraulic fluid 222 is received into port 266 and to outlet port 264. Pressurized hydraulic fluid 222 is supplied to port 266 through a by pass passage 268 in double flange 254. Pressurized hydraulic fluid 222 is only supplied to by pass passage 268 when tank 212 is pressurized by gas supplied through first and second control circuits 224 and 226.

A typical sequence of operation for control system 16 would be as follows assuming valve 12 is in the open position and it is desired to close valve 12. Referring to the flow diagram of FIG. 7, first control circuit 224, i.e., the "close" circuit, is operated by depressing first control valve 200. This operation causes the following functions to happen as pressurized gas is supplied:

(i) directs pressurized gas pressure to pilot operated normally open valve 218 to equalize pressure between actuator open fluid supply tank 214 and actuator close fluid supply tank 212;

(ii) directs pressurized gas pressure from outlet port 234 of first control circuit control valve 200 to pilot port 242 of first pilot operated valve 204 of valve closing first control circuit 224 to operate first pilot operated valve 204 and allow pressurized gas pressure to pressurize hydraulic fluid 222 in actuator close fluid supply tank 212 and supply pressurized hydraulic fluid 222 through by pass passage 268, through port 266 to outlet port 264 and thence to port 108 (close port) of actuator 14 to close valve 12; and (iii) directs pressurized gas pressure from outlet port 240 of first pilot operated valve 204 of first control circuit 224 to pilot port 242 of fourth pilot operated valve 210 of valve opening second control circuit 226 to operate fourth pilot operated valve 210 and vent pressurized gas pressure from actuator open fluid supply tank 214 through exhaust orifice valve 220. Closure of first control circuit control valve 200 to a closed position and operation of second control circuit control valve 202 to an open position results in the same operations described above but in reverse order to open valve 12.

Figure 9:
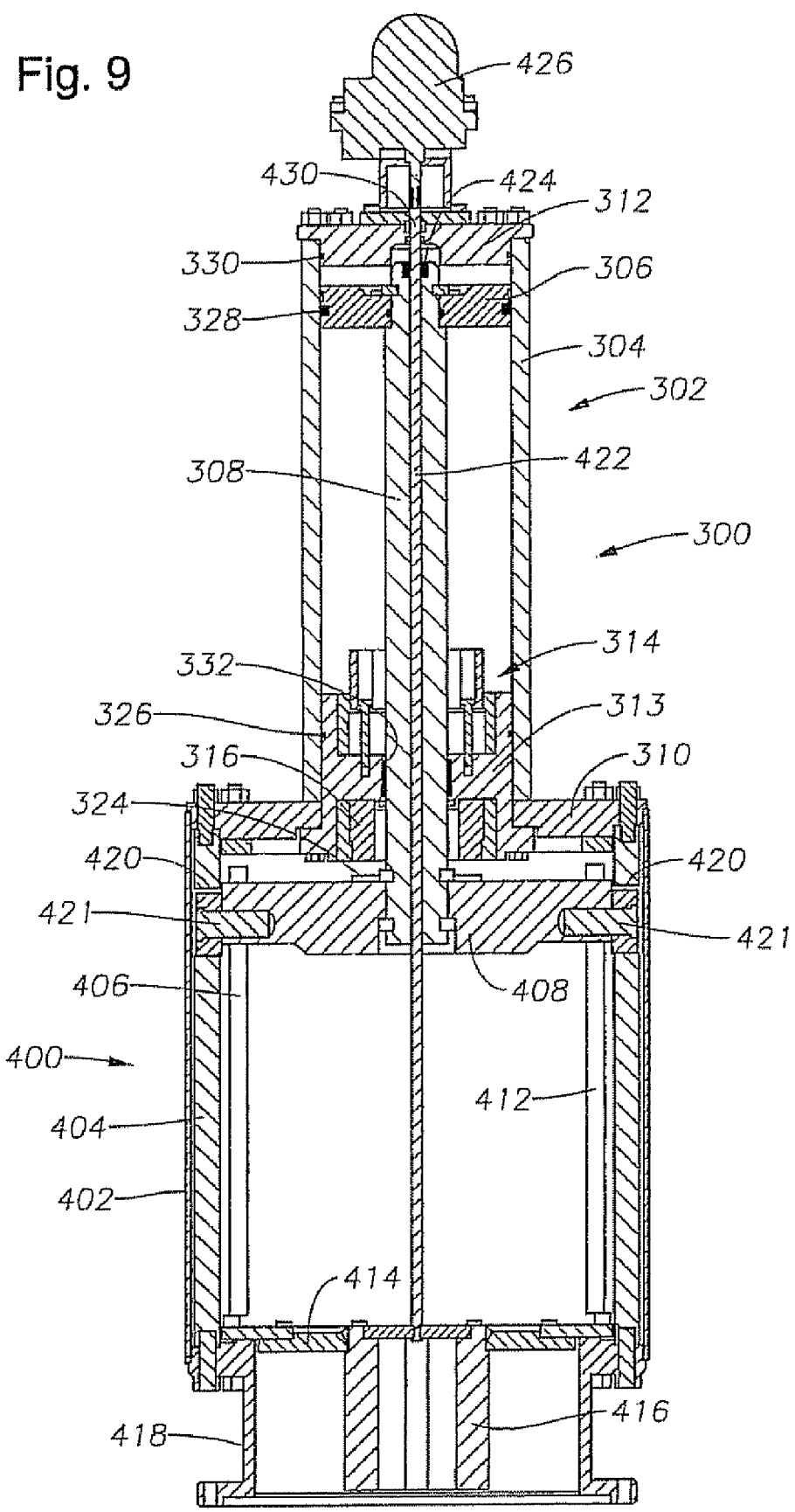
FIG. 9 is a cross-sectional view of a valve actuator constructed in accordance with embodiments of the invention.
Figure 10:
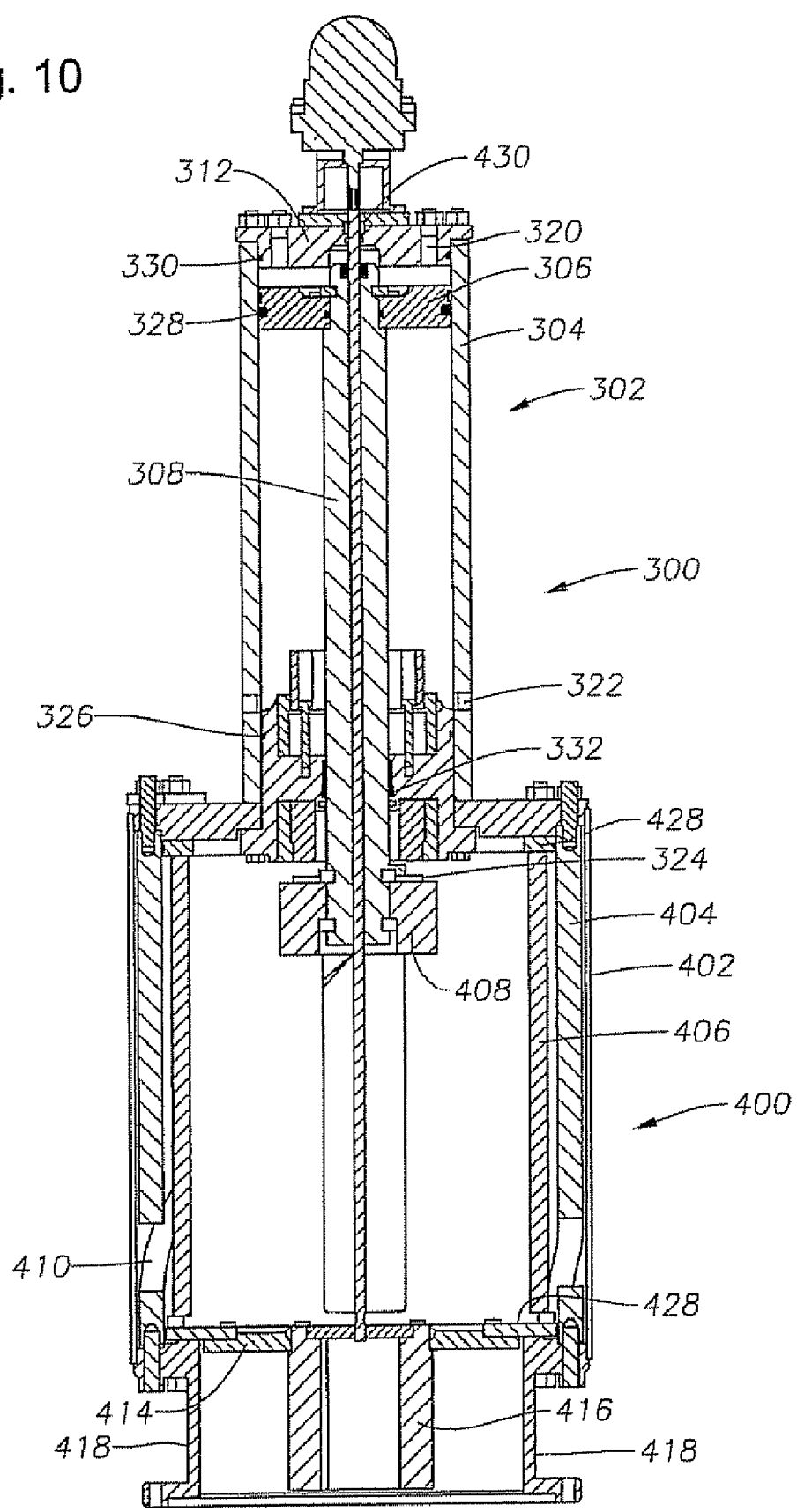
FIG. 10 is a cross-sectional view of the valve actuator of FIG. 9, taken perpendicular to the cross-section of FIG. 9.

Referring now to FIGS. 9 and 10, an alternate embodiment of an actuator system is shown. Actuator system 300 comprises a hydraulically isolated upper portion 302 and ambient pressure lower portion 400. Upper portion 302 comprises cylindrical housing 304, piston 306, shaft 308, connector flange 310, cylinder cap 312, stop housing 313, upper stop assembly 314, lower stop assembly 316. Fluid communication to upper portion 300 is provided by upper port 320 and lower port 322. Lower portion 400 comprises outer housing 402, fixed outer sleeve 404, rotating inner sleeve 406, axle 408, helical slot 410, straight slot 412, lower plate 414, stem connector 416, mounting spool 418, and sliding blocks 420. Actuator system also comprises indicator rod 422, floating seal 424, and position indicator 426.

Cap 312 is connected to cylindrical housing 304. Seals 330 form a fluid barrier between cap 312 and housing 304. Piston 306 sealingly engages cylindrical housing 304 via seals 328. Upper port 320 provides fluid communication through cap 312 into the sealed area between cap 312 and piston 306. Piston 306 is fixably coupled to shaft 308, which extends through stop housing 313. Seals 326 and 332 form a fluid barrier between stop housing 313 and cylindrical housing 304 and shaft 308, respectively. Lower port 322 provides fluid communication through cylindrical housing 304 into the sealed area between piston 306 and stop housing 313.

Pressurized fluid supplied to upper port 320 will move piston 306 and shaft 308 downward until piston contacts upper stop assembly 314. Pressurized fluid supplied to lower port 322 will move piston 306 and shaft 308 upward until stop ring 324 contacts lower stop assembly 316. Upper stop assembly 314 and lower stop assembly 316 are further described in reference to FIGS. 11 and 12, respectively.

Shaft 308 extends into lower portion 400 and is coupled to axle 408 such that the axial position of the axle is fixed relative to piston 306. Sliding blocks 420 are mounted to either end of axle 408 via bolts 421, or other suitable attachment members. Axle 408 engages straight slot 412 disposed in inner sleeve 406. Sliding blocks 420 engage helical slot 410 disposed in outer sleeve 404. Helical slot 410 may be disposed at any desired angle so as to optimize the operation of the actuator.

Fixed outer sleeve 404 is coupled to mounting spool 418 which is coupled to a corresponding mounting flange on the valve (not shown). Outer sleeve 404 is therefore fixed relative to the valve. Stem connector 416 is connected to the stem of the valve actuator (not shown), such as by a key slot or other fixing member. Stem connector 416 is also connected to inner sleeve 406 via lower plate 414. Therefore, inner sleeve 406 is rotatably linked to the valve stem and rotation of the inner sleeve will result in rotation of the valve stem. Bearings 428 provide rotational and axial support of inner sleeve 406 relative to outer sleeve 404.

Stem connector 416 is rotated by axially translating piston 306, which moves axially in unison with shaft 308 and axle 408. As axle 408 moves axially, sliding blocks 420 move through helical slot 410 and cause axle 408 to rotate about its central axis. The rotation of axle 408 will transfer through straight slot 412 and cause rotation of inner sleeve 406, lower plate 414, and stem connector 416.

Indicator rod 422 is coupled to stem connector 416, such as via a bolted plate, and will rotate with the stem connector. Indicator rod 422 is disposed within a bore through shaft 308 and is sealingly engaged by floating seal 424. Indicator rod 422 is coupled to position indicator 426, which provides a visual display of the position of the valve via the direct connection of the indicator rod.

The travel of actuator system 300 is limited by upper stop assembly 314 and lower stop assembly 316. These stop assemblies limit the axial travel of piston 306 and axle 408, thus limiting the rotational range of actuator assembly 300. Limiting the rotational range of actuator assembly 300 prevents excessive torque being applied to the actuator assembly or the valve, which may occur if the actuator attempts to turn the actuator or the valve past their designed limits of rotation. In certain embodiments, stop assemblies 314 and 316 may be adjustable so that the rotational range of actuator assembly 300 can be customized for a wide range of valves and operating conditions.

Figure 11:
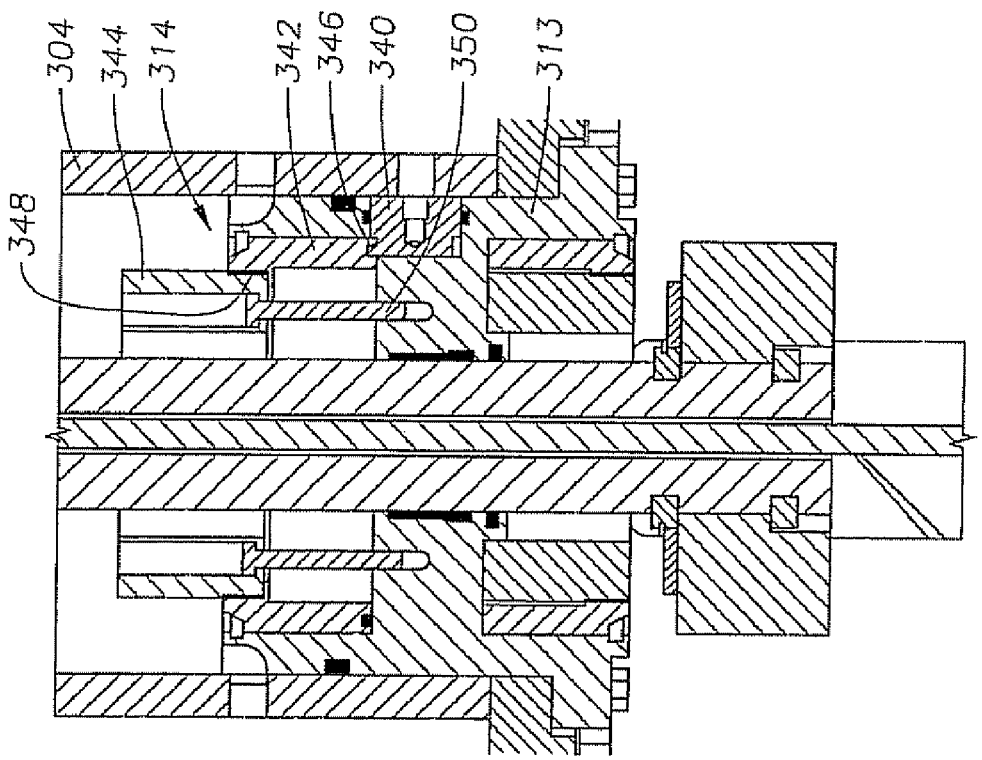
FIG. 11 is a cross-sectional view of an upper stop assembly constructed in accordance with embodiments of the invention.

Referring now to FIG. 11, upper stop assembly 314 comprises drive nut 340, rotating ring 342, and translating ring 344. Drive nut 340 is rotatably disposed in stop housing 313 and is accessible through the wall of housing 304 so that it can be rotated by an operator. Rotating ring 342 is axially restrained within stop housing 313 but is free to rotate. Translating ring 344 threadably engages rotating ring 342 and is connected to stop housing 313 via bolts 350, or other attachment members. As drive nut 340 is rotated, gear 346 causes rotating ring 342 to also rotate. As rotating ring 342 rotates, threads 348 will cause translating ring 344 to move axially along bolts 350. Referring back to FIGS. 9 and 10, as piston 306 moves downward it will contact translating ring 344. Therefore, as the axial position of translating ring 344 is adjusted, the downward travel limit of piston 306 is also adjusted.

Figure 12:
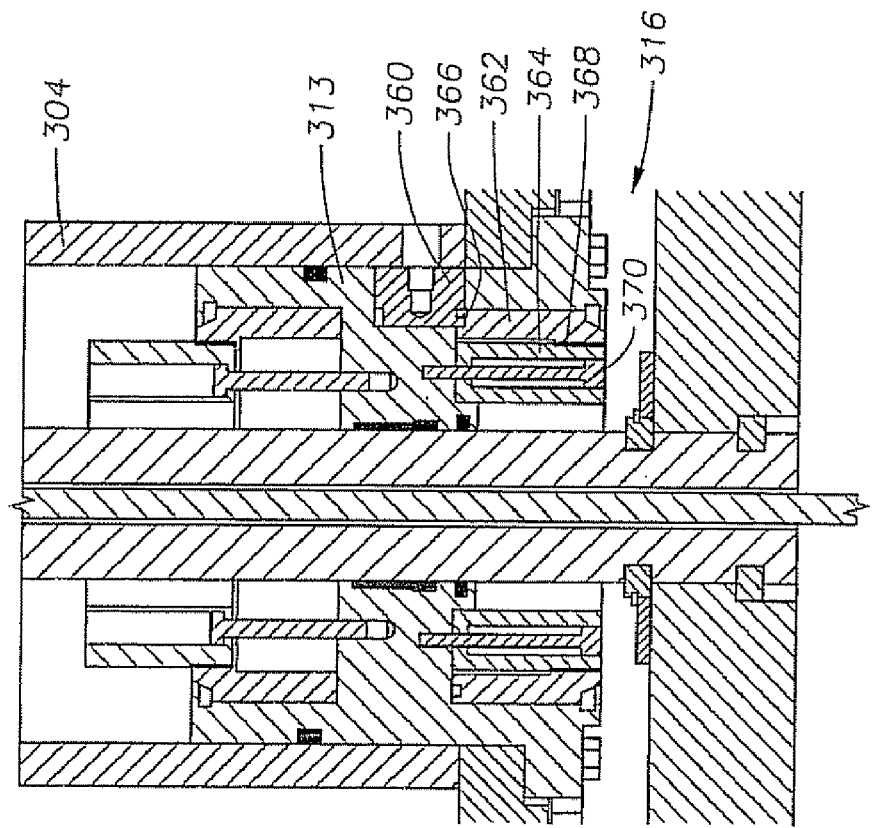
FIG. 12 is a cross-sectional view of an lower stop assembly constructed in accordance with embodiments of the invention.

Referring now to FIG. 12, lower stop assembly 316 comprises drive nut 360, rotating ring 362, and translating ring 364. Drive nut 360 is rotatably disposed in stop housing 313 and is accessible through the wall of housing 304 so that it can be rotated by an operator. Rotating ring 362 is axially restrained within stop housing 313 but is free to rotate. Translating ring 364 threadably engages rotating ring 362 and is connected to stop housing 313 via bolts 370, or other attachment members. As drive nut 360 is rotated, gear 366 causes rotating ring 362 to also rotate. As rotating ring 362 rotates, threads 368 will cause translating ring 364 to move axially along bolts 370. Referring back to FIGS. 9 and 10, as axle 408 moves upward, stop ring 324 will contact translating ring 364. Therefore, as the axial position of translating ring 364 is adjusted, the upward travel limit of axle 408 is also adjusted.

Figure 13:
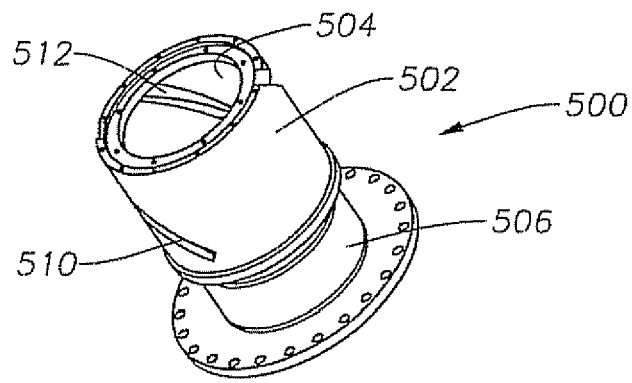
FIG. 13 is a lower portion of an actuator having an inner and outer helix.
Figure 14:
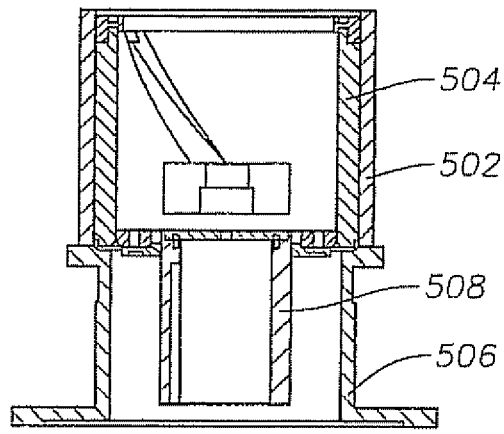
FIGS. 14 and 15 are cross-sectional views of the lower portion of FIG. 13.
Figure 15:
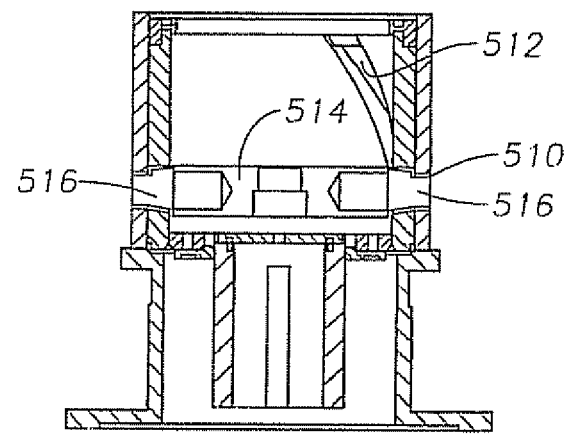

FIGS. 13-15 illustrate an alternate lower portion 500 comprising fixed outer sleeve 502, rotating inner sleeve 504, mounting spool 506, and stem connector 508. Fixed outer sleeve 502 is coupled to mounting spool 506, which is attached to the valve (not shown). Rotating inner sleeve 504 is rotatably disposed within outer sleeve 502 and is coupled to stem connector 508, which engages the valve stem (not shown). Outer sleeve 502 further comprises outer helical slot 510 and inner sleeve 504 comprises inner helical slot 512.

Axle 514 is disposed within inner sleeve 504. Sliding blocks 516 are attached to either end of axle 514 and are engaged with helical slots 510 and 512. As axle 514 moves vertically, the engagement of sliding blocks 516 and slots 510 and 512 will cause inner sleeve 504 to rotate relative to outer sleeve 502. Having both outer slot 510 and inner slot 512 be helical slots increases the rate of rotation of inner sleeve 504 per unit travel of axle 514. Therefore, as compared to actuator 300 of FIGS. 9 and 10, less linear stroke distance is required to rotate a valve stem a known number of degrees. Because less linear stroke is required lower portion 500 is generally shorter than lower portion 400 and can be coupled to an upper actuator portion that is shorter than upper portion 302. Decreasing the length of the members also increases their inherent strength and rigidity. In certain embodiment, the sleeves may also comprise covers fitted over the slots and welded, or otherwise fastened, to the sleeves.

The torque generated by the actuator, which is used to rotate the valve closure member, is transferred entirely through the interface between the sliding blocks and the slots in both the stationary and rotating sleeves. Sliding blocks may have a substantially cylindrical shape so that the blocks roll within the slots. In certain embodiments, sliding blocks may preferably have an elongated shape so that the contact between the block and its slot is distributed over a larger area. In certain embodiments, the sliding blocks may be inlaid with a friction reducing or wear resistant material so as to increase the useful life and performance of the system.

Figure 16:
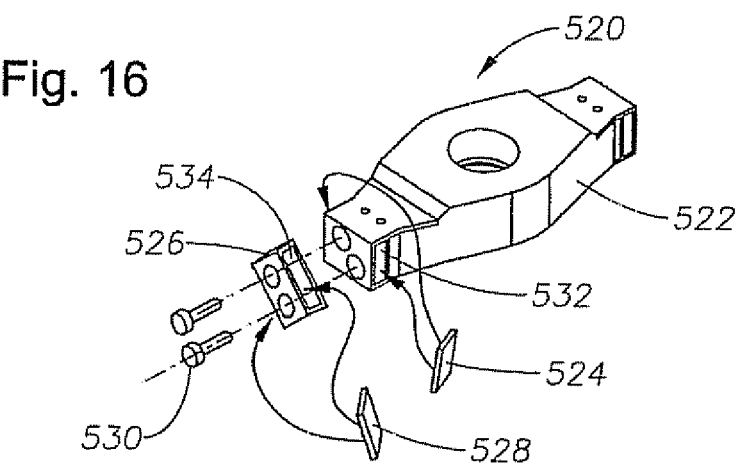
FIG. 16 is an exploded view of an axle and sliding block assembly constructed in accordance with embodiments of the invention.

Referring now to FIG. 16, one embodiment of an axle and sliding block assembly 520 is shown comprising axle 522, straight slot insert 524, helix slide block 526, and helix slot insert 528. Helix slide block 526 is attached to axle 522 by pins 530, or some other attachment member. Straight slot insert 524 is a substantially flat piece of material that is affixed in cavity 532. Insert 524 projects above the surface of axle 522 so that the insert contacts the sides of the slot. Although one end of axle 522 is shown, it is understood that each end of the axle includes two inserts 524 and cavities 532 disposed on opposite sides of the axle.

Helix slide blocks 526 may be constructed separate from axle 522 and attached to each end of the axle by pins 530. Helix slide blocks 526 are attached at an angle to the upper surface of axle 522. The angle of attachment is substantially equivalent to the angle of the helical slot in the stationary sleeve. Helix slot inserts 528 are disposed within cavities 534 on either side of blocks 526. Because the helical slot is curved in two directions, helix slot inserts 528 have an outer surface that is curved so as to substantially follow the contour of the sides of the helical slot.

The construction of our system for controlling fluid flow through a pipeline including valve, actuator and control system will be readily understood from the foregoing description and it will be seen that we have provided a system that allows minimizing the size of the actuator and operation of the control system in a manual mode that automatically prevents accidental operation by pipeline pressure while minimizing the condensate vented to the atmosphere during operation. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A valve actuator comprising:
a lower housing comprising a mounting spool that is operable to couple to a valve body;
a rotating sleeve disposed within said lower housing and coupled to a stem connector;
a fixed sleeve disposed within said lower housing;
a first slot disposed in the fixed sleeve;
a second slot disposed in the rotating sleeve, wherein both said first slot and said second slot are helical slots;
an axle engaged with both said first slot and said second slot;
a shaft coupled to said axle and extending through a connector flange that is coupled to an upper end of said lower housing; and
a piston coupled to said shaft and movably disposed within an upper housing that is coupled to the connector flange, wherein axial movement of said piston within the upper housing will result in rotational movement of said rotating sleeve.

2. The valve actuator of claim 1 wherein the upper housing is hydraulically isolated from said lower housing.

3. The valve actuator of claim 1 further comprising a first pair of sliding blocks that engage said first slot.

4. The valve actuator of claim 3 further comprising a second pair of sliding blocks that engage said second slot.

5. The valve actuator of claim 4 wherein the pair of sliding blocks that is engaged with the helical slot have outer surfaces curved in two directions.

6. The valve actuator of claim 1 further comprising:
an upper stop assembly that limits the axial movement of said piston toward said lower housing; and
a lower stop assembly that limits the axial movement of said piston away from said lower housing.

7. The valve actuator of claim 6 wherein said upper stop assembly limits axial movement by contacting said piston.

8. The valve actuator of claim 6 wherein said lower stop assembly limits axial movement by contacting said axle.

9. The valve actuator of claim 6 wherein said upper and lower stop assemblies are adjustable.

10. The valve actuator of claim 1 further comprising:
a position indicator coupled to an upper end of said upper housing; and
an indicator rod directly connecting the stem connector to the position indicator.

11. A valve actuator comprising:
a rotating sleeve disposed in a lower housing and coupled to a stem connector that is operable to couple to a rotatable valve stem;
a fixed sleeve coupled to an adapter bushing that is operable to couple to a valve body;
an axle engaged with a first slot disposed said rotating sleeve and a second slot disposed in said fixed sleeve, wherein at least one of the first slot or second slot is at an angle to vertical;
a piston coupled to said axle via a shaft, wherein said piston is movably disposed within an upper housing, wherein axial movement of said piston within the upper housing will result in rotational movement of said stem connector;
an upper stop assembly coupled to the lower housing and having a first translating member that adjustably extends from said upper stop assembly so as to contact said piston and limit the movement of said piston in a first axial direction; and
a lower stop assembly coupled to the lower housing and having a second translating member that adjustably extends from said lower stop assembly so as to contact said axle and limit the movement of said piston in a second axial direction.

12. The valve actuator of claim 11 wherein the lower housing is hydraulically isolated from the upper housing.

13. The valve actuator of claim 11 further comprising a first pair of sliding blocks coupled to said axle and engaged with the first slot.

14. The valve actuator of claim 13 further comprising a second pair of sliding blocks coupled to said axle and engaged with the second slot.

15. The valve actuator of claim 14 wherein the pair of sliding blocks that is engaged with the helical slot have outer surfaces curved in two directions.

16. The valve actuator of claim 11 further comprising:
a position indicator coupled to an upper end of the upper housing; and
an indicator rod directly connecting the stem connector to the position indicator.

17. The valve actuator of claim 11 wherein both said first slot and said second slot are helical slots.

18. A valve actuator comprising:
a piston moveably disposed within an upper housing;
a shaft coupled to said piston and extending into a lower housing;
an axle coupled to said shaft and moveably disposed within the lower housing;
a rotating sleeve disposed within the lower housing and comprising a first slot that engages said axle;
a fixed sleeve disposed within the lower housing and comprising a second slot that engages said axle, wherein the first and second slots are arranged so that axial displacement of said axle causes said rotating sleeve to rotate relative to said fixed sleeve;
an adapter bushing coupled to said fixed sleeve and operable to couple to a valve body;
a stem connector coupled to said rotating sleeve and operable to couple to a valve stem of the valve body;
a position indicator coupled to an upper end of said upper housing; and
an indicator rod directly connecting said connector to said position indicator.

19. The valve actuator of claim 18 wherein the upper housing is hydraulically isolated from the lower housing.

20. The valve actuator of claim 18 further comprising:
a first pair of sliding blocks that engage said first slot; and
a second pair of sliding blocks that engage said second slot.

21. The valve actuator of claim 20 wherein the pair of sliding blocks that is engaged with the helical slot have outer surfaces curved in two directions.

22. The valve actuator of claim 18 further comprising:
an upper stop assembly that limits the axial movement of said piston toward said lower housing; and
a lower stop assembly that limits the axial movement of said piston away from said lower housing.

23. The valve actuator of claim 22 wherein said upper and lower stop assemblies are adjustable.

24. The valve actuator of claim 18 wherein both said first slot and said second slot are helical slots.

* * * * *